United States Patent
Mittal et al.

(10) Patent No.: US 10,412,047 B2
(45) Date of Patent: Sep. 10, 2019

(54) METHOD AND SYSTEM FOR NETWORK TRAFFIC STEERING TOWARDS A SERVICE DEVICE

(71) Applicant: c/o Arista Networks, Inc., Santa Clara, CA (US)

(72) Inventors: Anuraag Mittal, Santa Clara, CA (US); Aparna Karanjkar, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 75 days.

(21) Appl. No.: 15/679,799

(22) Filed: Aug. 17, 2017

(65) Prior Publication Data

US 2019/0058692 A1 Feb. 21, 2019

(51) Int. Cl.
*H04L 12/721* (2013.01)
*H04L 29/06* (2006.01)
*H04L 12/751* (2013.01)
*H04L 12/24* (2006.01)

(52) U.S. Cl.
CPC ...... *H04L 63/0227* (2013.01); *H04L 41/0893* (2013.01); *H04L 41/5054* (2013.01); *H04L 45/02* (2013.01); *H04L 41/5077* (2013.01); *H04L 63/0209* (2013.01)

(58) Field of Classification Search
CPC ............. H04L 63/0227; H04L 41/0893; H04L 41/5054; H04L 45/02; H04L 41/5077; H04L 63/0209
See application file for complete search history.

(56) References Cited

U.S. PATENT DOCUMENTS

| | | | |
|---|---|---|---|
| 2014/0064091 | A1 | 3/2014 | Basso |
| 2014/0198647 | A1 | 7/2014 | Chowdhury |
| 2016/0036703 | A1 | 2/2016 | Josyula |
| 2016/0080247 | A1* | 3/2016 | Yang ...................... H04L 45/124 370/392 |
| 2016/0156560 | A1 | 6/2016 | Yasuda |
| 2017/0099182 | A1 | 4/2017 | DeBolle et al. |
| 2017/0346736 | A1 | 11/2017 | Chander et al. |
| 2018/0123827 | A1 | 5/2018 | Josyula |
| 2018/0139098 | A1* | 5/2018 | Sunavala ............ H04L 41/0816 |
| 2019/0028424 | A1* | 1/2019 | Mittal .................... H04L 61/103 |

\* cited by examiner

*Primary Examiner* — Melvin C Marcelo

(74) *Attorney, Agent, or Firm* — Chamberlain, Hrdlicka, White, Williams & Aughtry

(57) ABSTRACT

A method and system for steering network traffic towards a service device. Specifically, the disclosed method and system entail the installation of multiple service devices around a network. Service policies are cloned across the multiple service devices, and further, each service device is assigned common virtual routing and bridging addresses. Using at least these common virtual routing and bridging addresses, intercept virtual tunnel end points (VTEPs) redirect or bridge network traffic to a service device.

20 Claims, 7 Drawing Sheets

METHOD AND SYSTEM FOR NETWORK TRAFFIC STEERING TOWARDS A SERVICE DEVICE

BACKGROUND

In a typical data center topology, there is a layer of edge switches, which are representative of entry points of the data center. There is also a layer of leaf switches, which connect to hosts in the data center; and subsequently, there is a layer of spine switches, which connect the edge and leaf layers.

SUMMARY

In general, in one aspect, the disclosure relates to a method for steering a media access control (MAC) frame. The method includes receiving redirect criteria by an intercept virtual tunnel end point (VTEP), receiving, from a source host, the MAC frame including a set of data fields, wherein the set of data fields comprises an original virtual layer-2 (VL2) broadcast domain tag, making a first determination, based on a matching of at least one data field of the set of data fields with the redirect criteria, to steer the MAC frame towards a common virtual VTEP Internet Protocol (IP) address instead of a destination IP address specified in the MAC frame, wherein the destination IP address is associated with a first destination host, and transmitting, based on the first determination, the MAC frame towards a service device operatively connected to the common virtual VTEP IP address.

In general, in one aspect, the disclosure relates to a system. The system includes a service device of a plurality of service devices, a plurality of network elements operatively connected to the plurality of service devices, a source host directly connected to a first network element of the plurality of network elements, and an intercept virtual tunnel end point (VTEP) executing on the first network element, and configured to receive redirect criteria, receive, from the source host, a media access control (MAC) frame including a set of data fields, wherein the set of data fields includes an original virtual layer-2 (VL2) broadcast domain tag, make a first determination, based on a matching of at least one data field of the set of data fields with the redirect criteria, to steer the MAC frame towards a common virtual VTEP Internet Protocol (IP) address instead of a destination IP address specified in the MAC frame, wherein the destination IP address is associated with a destination host, and transmit, based on the first determination, the MAC frame towards the service device, wherein the plurality of service devices is operatively connected to the common virtual VTEP IP address.

In general, in one aspect, the disclosure relates to a non-transitory computer readable medium (CRM). The non-transitory CRM includes computer readable program code, which when executed by a computer processor, enables the computer processor to receive redirect criteria by an intercept virtual tunnel end point (VTEP), receive, from a source host, a media access control (MAC) frame including a set of data fields, wherein the set of data fields includes an original virtual layer-2 (VL2) broadcast domain tag, make a first determination, based on a matching of at least one data field of the set of data fields with the redirect criteria, to steer the MAC frame towards a common virtual VTEP Internet Protocol (IP) address instead of a destination IP address specified in the MAC frame, wherein the destination IP address is associated with a first destination host, and transmit, based on the first determination, the MAC frame towards a service device operatively connected to the common virtual VTEP IP address.

Other aspects of the disclosure will be apparent from the following description and the appended claims.

DETAILED DESCRIPTION

Figure 1:
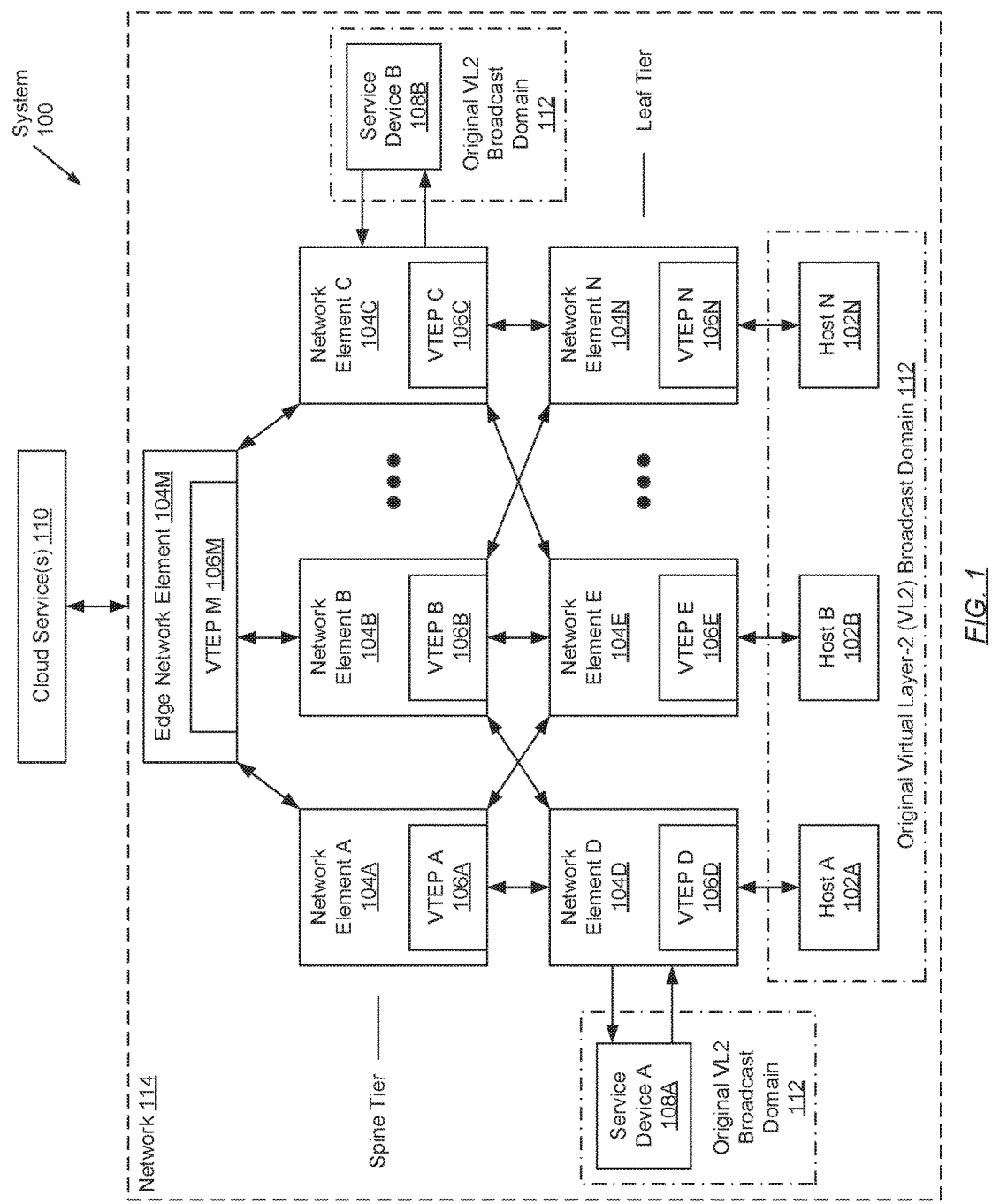
FIG. 1 shows a system in accordance with one or more embodiments of the disclosure.

Specific embodiments of the disclosure will now be described in detail with reference to the accompanying figures. In the following detailed description of the embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In the following description of FIGS. 1-4, any component described with regard to a figure, in various embodiments of the disclosure, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure relate to a method and system for steering network traffic towards a service device. Specifically, one or more embodiments of the disclosure entails the installation of multiple service devices around a network. Service policies are cloned across the multiple service devices, and further, each service device is assigned common virtual routing and bridging addresses. Using at least these common virtual routing and bridging addresses, intercept virtual tunnel end points (VTEPs) redirect or bridge network traffic to a service device.

One or more embodiments of the disclosure hereinafter may be described in conjunction with the virtual extensible local area network (VXLAN) layer-3 (L3) encapsulation and tunneling protocol. However, one of ordinary skill in the art will appreciate that the disclosure may be practiced alongside alternative tunneling mechanisms. These other tunneling mechanisms may include, for example, multi-protocol label switching (MPLS), generic routing encapsulation (GRE), and other existing or future developed tunneling mechanisms. The aforementioned tunneling mechanisms may be collectively referred to as virtual L3 (VL3) tunnels.

FIG. 1 shows a system in accordance with one or more embodiments of the disclosure. The system (100) includes one or more interconnected network element(s) (104A-104M). A first portion of the network elements (104A-104C, 104M) reside at a spine tier of a network (114), whereas a second portion of the network elements (104D-104N) reside at a leaf tier of the network (114). Each of the leaf tier network elements (104D-104N) may be directly connected to one or more host(s) (102A-102N). In addition, a respective VTEP (106A-106M) may be executing on each network element (104A-104M). The system (100) further includes one or more service device(s) (108A, 108B) strategically placed at varying locations throughout the network (114). The system (100) also includes one or more cloud service(s) (110) operatively connected, via a L3 fabric (not shown), to all or a portion of the aforementioned components of the network (114). In addition, the system (100) includes an original virtual layer-2 (VL2) broadcast domain (112) employed by at least the one or more hosts (102A-102N) and the one or more service devices (108A, 108B). Each of these components is described below.

In one embodiment of the disclosure, a network element (104A-104M) may be a physical device that includes persistent storage, memory (e.g., random access memory (RAM), shared memory), one or more computer processor(s) (e.g., integrated circuits) (including a switch chip or network processor)), and two or more physical network interfaces or ports. The computer processor(s) (e.g., the switch chip or network processor) may be hardware that determines out of which egress port on the network element (104A-104M) to forward media access control (MAC) frames. The computer processor(s) (e.g., the switch chip or network processor) may include egress and ingress ports that may connect to the physical network interfaces or ports on the network element (104A-104M). Further, each physical network interface or port may or may not be connected to another component (e.g., a host (102A-102N), another network element (104A-104M), a service device (108A, 108B), the L3 fabric (not shown)) in the system (100). A network element (104A-104M) may be configured to receive network packets via the network interfaces or ports, and determine whether to: (i) drop the network packet; (ii) process the network packet in accordance with one or more embodiments of the disclosure (see e.g., FIGS. 2A-3C); and/or (iii) send the network packet, based on the processing, out another network interface or port on the network element (104A-104M).

How the network element (104A-104M) makes the determination of whether to drop a network packet, and/or send a network packet to another component in the system (100) depends, in part, on whether the network element (104A-104M) is a layer-2 (L2) switch or a L3 switch (also referred to as a multilayer switch), which may perform at least some functions of a router. If the network element (104A-104M) is operating as a L2 switch, the network element (104A-104M) uses the destination MAC address along with a forwarding table or policy to determine out of which network interface or port to send the network packet. If the network element (104A-104M) is operating as a L3 switch, the network element (104A-104M) uses the destination Internet Protocol (IP) address along with a routing table or policy to determine out of which network interface or port to send the network packet, and includes the ability to write the MAC address of the next hop (or component) to receive the network packet in place of its own MAC address (which the last hop or component to send the network packet wrote) in the L2 information encapsulating the network packet. If the network element (104A-104M) is a multilayer switch, the network element (104A-104M) includes functionality to process network packets using both MAC addresses and IP addresses.

In one embodiment of the disclosure, the persistent storage on a network element (104A-104M) may include any type of non-transitory computer readable medium that includes instructions, which, when executed by the one or more computer processors, enable the network element (104A-104M) to perform any of the functionalities described above, as well as embodiments of the disclosure described below in reference to FIGS. 2A-3C. Moreover, examples of a network element (104A-104M) include, but are not limited to, a switch, a router, and a multilayer switch. A network element (104A-104M) is not limited to the aforementioned specific examples.

In one embodiment of the disclosure, a network element (104A-104M) may include a VTEP (106A-106M). A VTEP (106A-106M) may be an entity (e.g., software) which originates and/or terminates virtual L3 (VL3) tunnels. Further, a VTEP (106A-106M) may be capable of: (i) encapsulating a MAC frame to obtain a VL3 frame; (ii) receiving a VL3 frame from a remote VTEP (106A-106M); and (iii) decapsulating (i.e., removing the VL3 frame header from) a received VL3 frame to obtain a MAC frame therein before delivering the MAC frame to an operatively connected host (102A-102N) or a service device (108A, 108B). In one embodiment of the disclosure, a VL3 frame may be a VXLAN frame, whereas the virtual tunnel through which VXLAN frames traverse may be a VXLAN tunnel. Embodiments of the disclosure are not limited to any specific implementation or protocol for generating/instantiating VL3 frames and/or virtual tunnels.

In one embodiment of the disclosure, a host (102A-102N) may be any type of system (e.g., software and computer hardware) that is configured to generate, send, receive, and/or process requests and replies either locally or over a network using software and computer hardware. A host (102A-102N) may include one or more processor(s), memory, and one or more physical network interface(s). Further, a host (102A-102N) may include functionality to generate, receive, and/or transmit MAC frames. Examples of a host (102A-102N) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

In one embodiment of the disclosure, a cloud service (110) may be a platform for the centralized management of, and consolidation of state information for, all or a portion of the network elements (104A-104M) in the system (100). A cloud service (110) may be implemented as one or more physical or virtual device(s), which includes at least one or more processor(s), memory, and one or more physical network interface(s). In one embodiment of the disclosure, a cloud service (110) includes executable instructions (stored in a non-transitory computer readable medium), which when executed, enable the cloud service (110) to perform embodiments of the disclosure described below (see e.g., FIG. 2B).

In one embodiment of the disclosure, a service device (108A, 108B) may be a physical or virtual computing device that includes functionality to provide a service to network elements (104A-104M) and/or hosts (102A-102N) physically located at any position within the system (100). A service device (108A, 108B) may include at least one or more processor(s), memory, and two or more physical interfaces. In one embodiment of the disclosure, a service device (108A, 108B) may include functionality to process network traffic, redirected to them, in accordance with the configuration of, and the specific service thus provided by, the service device (108A, 108B) to components of the network (112) (or system (100)). Subsequently, a service device (108A, 108B) may include functionality to filter, mirror, store, forward, drop, and/or perform any other action, or any combination thereof, to redirected network traffic, which is afforded by the configuration and provided network service of the service device (108A, 108B). Examples of a service device (108A, 108B) include, but are not limited to, a network security device (e.g., a firewall device, a denial of service (DOS) attack scrubber), a network filtering device (e.g., a web content filter), a network data cache (e.g., a web-cache device), and a network load balancing device.

In one embodiment of the disclosure, the L3 fabric (not shown) may be a set of interconnected network elements or systems, which operatively connect the cloud service(s) (110) to the network (114). The L3 fabric includes functionality to facilitate communications between these aforementioned components. The L3 fabric may include any combination of local area network (LAN) and/or wide area network (WAN) segments, such as the Internet, which may employ any combination of wired and/or wireless connections and communication protocols.

In one embodiment of the disclosure, the original VL2 broadcast domain (112) may be defined as the set of computing devices (e.g., hosts (102A-102N) and service devices (108A, 108B)) that communicate using the same virtual network identifier (VNI) (e.g., an original VNI), where the VNI is defined by, for example, the VXLAN protocol. A VNI identifies the scope of the MAC frame originated by a computing device such that the MAC frame may only be sent to another computing device associated with the same VNI. In one embodiment of the disclosure, a MAC frame may be sent to a computing device associated with a different VNI if the MAC frame is routed into a new VL2 broadcast domain (not shown). By way of examples, the original VL2 broadcast domain (112) may be implemented as a virtual local area network (VLAN) domain and/or a VXLAN domain. Embodiments of the disclosure are not limited to these specific examples.

While FIG. 1 shows a configuration of components, other system configurations may be used without departing from the scope of the disclosure. For example, the system (100) may further include one or more virtual machine(s) executing on any underlying hardware component portrayed in the system (100).

In one embodiment of the disclosure, a virtual machine (VM) may be a software based emulation of a computing device. Subsequently, a VM may be assigned all or a portion of the various hardware included in the underlying physical system (e.g., a host (102A-102N), a network element (104A-104M), a service device (108A, 108B)) that is serving as the VM host. Hosting a VM may include, but is not limited to, providing the VM the hardware resources assigned to the VM, scheduling time for the VM to use various physical hardware resources (e.g., a processor, network resources, etc.), and translating instructions from the VM into instructions that are understood by the underlying physical hardware, operating system, and/or hypervisor of the underlying physical system. In one embodiment of the disclosure, a hypervisor (i.e., a VM monitor) may be computer software that includes the ability to create, execute, and/or, at least in part, manage VMs executing on an underlying physical system. Moreover, a VM may include functionality to generate, receive, and/or transmit MAC frames.

Figure 2A:
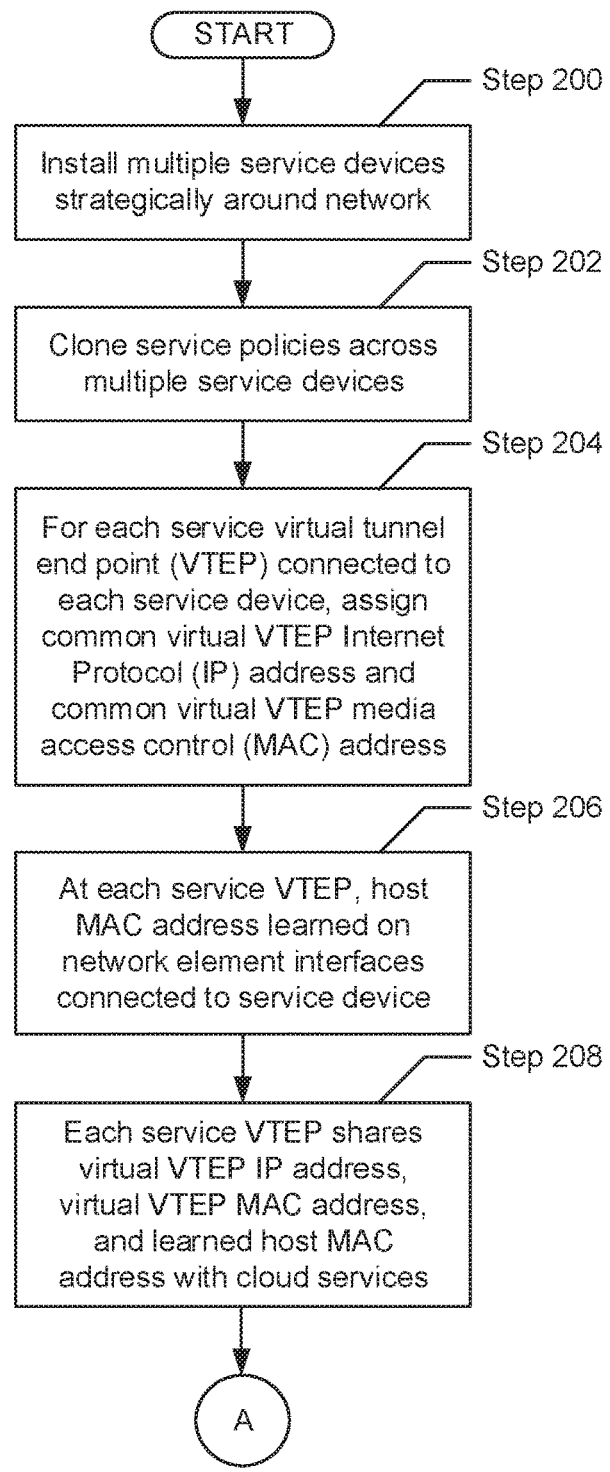
FIGS. 2A and 2B show flowcharts describing a method for configuring VTEPs in a network in accordance with one or more embodiments of the disclosure.
Figure 2B:
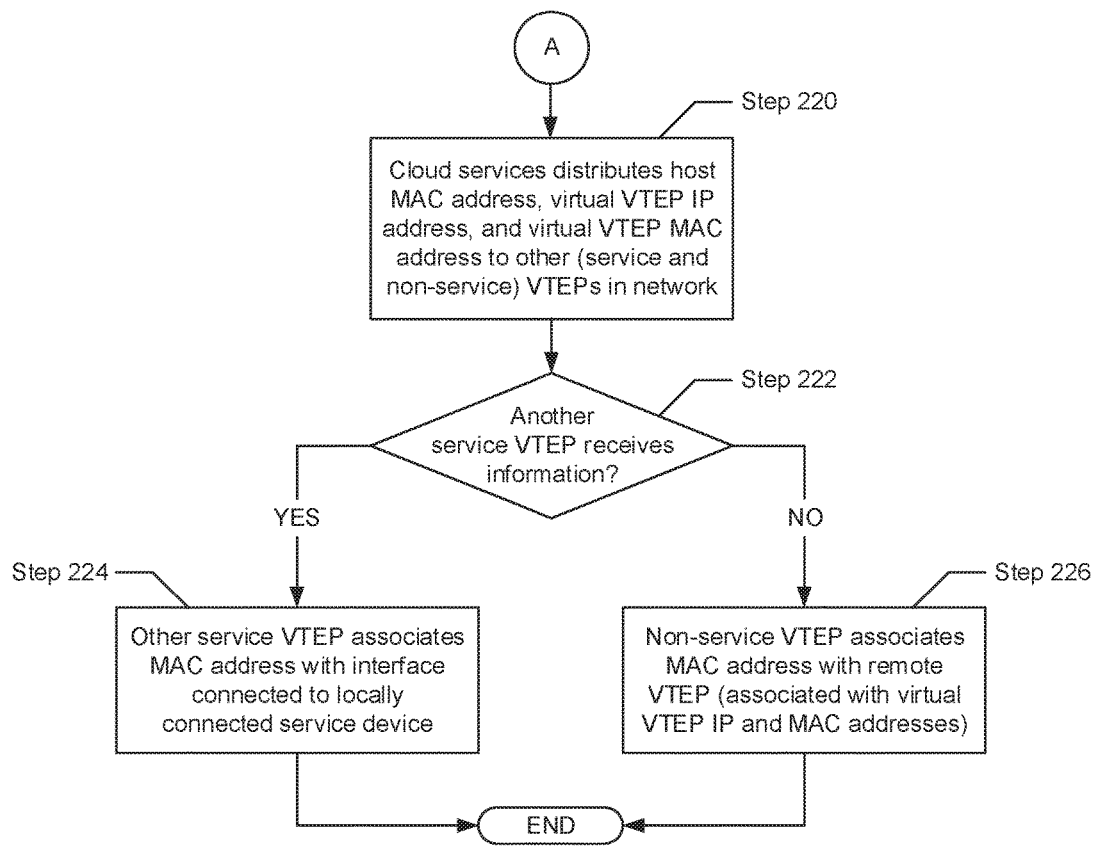

FIGS. 2A and 2B show flowcharts describing a method for configuring VTEPs in a network in accordance with one or more embodiments of the disclosure. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the disclosure, the steps shown in FIGS. 2A and 2B may be performed in parallel with any other steps shown in FIGS. 2A-3B without departing from the scope of the disclosure.

Turning to FIG. 2A, in Step 200, multiple service devices are installed strategically around a network. In one embodiment of the disclosure, the multiple service devices are placed around the network at locations where network traffic (to be redirected to a service device) would not need to traverse the entire network in order to arrive at the service device. For example, when considering network traffic entering the network at an edge network element (see e.g., FIG. 1, 104M), it may be strategic to install a service device proximal to the edge network element, thereby preventing the network traffic from traversing the spine and/or leaf tiers of the network in order to arrive at another service device. In one embodiment of the disclosure, a proximity of a service device to, for example, the edge network element may be defined as: (i) connecting the service device directly to the edge network element; or (ii) connecting the service device directly to a spine tier network element that is within a predetermined number of next hops away from the edge network element. Other methods for strategically installing service devices around the network may be employed without departing from the scope of the disclosure.

In Step 202, one or more service policies are cloned across the multiple service devices (installed in Step 200). In one embodiment of the disclosure, each service policy may include instructions, in the form of computer readable program code, which when executed by a service device, enable the service device to perform a service function to network traffic redirected to the service device. Each service policy may further include redirect criteria, which specify the requirements (to be matched) in order to steer or redirect network traffic towards a service device. The redirect criteria may include, but are not limited to, matching requirements tied to: (i) a specific network element (i.e., a service policy may require that any network traffic originating from or destined to a specific network element must be redirected to a service device first); (ii) a specific network interface on a network element (i.e., a service policy may require that any inbound and/or outbound network traffic traversing a specific network interface on a network element must be redirected to a service device first); (iii) a specific host or virtual machine (i.e., a service policy may require that any network traffic originating from or destined to a specific host or virtual machine must be redirected to a service device first); (iv) a specific source IP or MAC address and destination IP or MAC address pair (i.e., a service policy may require that any network traffic including a specific source IP/MAC address and a specific destination IP/MAC address must be redirected to a service device first); and (v) a specific VL2 broadcast domain (e.g., virtual local area network (VLAN)) and IP or MAC address pair (i.e., a service policy may require that any network traffic including a specific VL2 broadcast domain tag (e.g., VLAN tag) (or VNI) and a specific IP/MAC address (associated with either a source or a destination) must be redirected to a service device first). Embodiments of the disclosure are not limited to the above-mentioned examples. Moreover, in one embodiment of the disclosure, the service function(s) a service device may be capable of performing include, but are not limited to, filtering, mirroring, storing, forwarding, and/or dropping network traffic redirected towards the service device. A service device may perform additional or alternative actions to network traffic, in accordance with the specific configuration of and network service provided by the service device, without departing from the scope of the disclosure.

In Step 204, multiple service VTEPs are assigned a common virtual VTEP IP address and a common virtual VTEP MAC address. In one embodiment of the disclosure, a service VTEP may be a VTEP executing on a network element directly connected to a service device. Therefore, for each service device (installed in Step 200), the respective VTEP executing on each network element directly connected to each service device is assigned the same virtual VTEP IP address and the same virtual VTEP MAC address. When redirecting network traffic, this common virtual VTEP IP address and common virtual VTEP MAC address enable an intercept VTEP (i.e., a VTEP executing on a network element whereon network traffic is intercepted per service policy redirect criteria) to forward network traffic to any one of the installed service devices in the network.

In Step 206, each service VTEP discovers the network interface(s) (on its respective network element) directly connected to its respective service device. In one embodiment of the disclosure, through this discovery, each service VTEP may subsequently learn the MAC addresses associated with one or more hosts, if any. These one or more hosts may be directly connected to network elements on which each service VTEP may be executing, or alternatively, may be directly connected to other remote network elements (i.e., network elements on which service VTEPs are not executing). In one embodiment of the disclosure, learning of the aforementioned MAC addresses may be achieved by means of, for example, a VL3 (e.g., VXLAN) control plane protocol, information exchange with a cloud service, or the direct routing/handling of network traffic from a host (which may or may not have been redirected towards a service device). Thereafter, each service VTEP subsequently stores each learned host MAC address, if any, along with the discovered network interface(s) (directly connected to its respective service device) as an association.

In Step 208, each service VTEP then shares the learned host MAC address(es), if any, along with the assigned virtual VTEP IP and/or virtual VTEP MAC addresses with the one or more cloud services (see e.g., FIG. 1, 110). Further, in one embodiment of the disclosure, each learned host MAC address and virtual VTEP IP/MAC address combination may be referred to as a host MAC to virtual VTEP IP mapping, a host MAC to virtual VTEP MAC mapping, or a host MAC to virtual IP and MAC mapping. From here, the process proceeds to Step 220 (see e.g., FIG. 2B).

Turning to FIG. 2B, in Step 220, each received host MAC to virtual VTEP IP and/or MAC mapping (shared by each service VTEP in Step 208) is distributed to other VTEPs in the network. In one embodiment of the disclosure, the distribution of the mappings may be performed by the one or more cloud service(s) with which the mappings were shared. In one embodiment of the disclosure, after receiving but prior to distributing the mappings, the one or more cloud service(s) may consolidate the mappings within a local or operatively connected data repository. Further, the other VTEPs in the network, which may subsequently receive a host MAC to virtual VTEP IP and/or MAC mapping, may include: (i) another service VTEP, which did not share the respective mapping; or (ii) a non-service VTEP (i.e., a VTEP executing on a network element that is not directly connected to a service device).

In Step 222, a determination is made as to whether another service VTEP received the host MAC to virtual VTEP IP and/or MAC mapping (distributed in Step 220). If it is determined that another service VTEP is the recipient of the distributed mapping, the process proceeds to Step 224. On the other hand, if it is determined that a non-service VTEP is the recipient of the distributed mapping, the process proceeds to Step 226.

In Step 224, after determining (in Step 222) that another (recipient) service VTEP is the recipient of the distributed mapping, the recipient service VTEP associates the host MAC address (specified in the mapping) to a network interface. In one embodiment of the disclosure, the network interface belongs to the network element on which the recipient service VTEP is executing and is directly connected to a service device respective to the recipient service VTEP. By associating the obtained host MAC address as a local address (rather than a remote MAC address associated with a remote VTEP IP address), any recipient service VTEP is extended the functionality to process and bridge any redirected network traffic to their respective, directly connected service device. In one embodiment of the disclosure, with this association in place, the multiple service devices (installed in Step 200), though dispersed individually at different physical locations around the network, may be recognized collectively and logically as a single service device.

In Step 226, after determining (in Step 222) that a non-service VTEP is the recipient of the distributed mapping, the non-service VTEP associates the host MAC address (specified in the mapping) as a remote MAC address that corresponds to a remote VTEP IP address. In other words, in one embodiment of the disclosure, with this association in place, any non-service VTEP is granted the functionality to process and redirect any intercepted network traffic to a service VTEP (associated with the virtual VTEP IP address specified in the mapping).

Figure 3A:
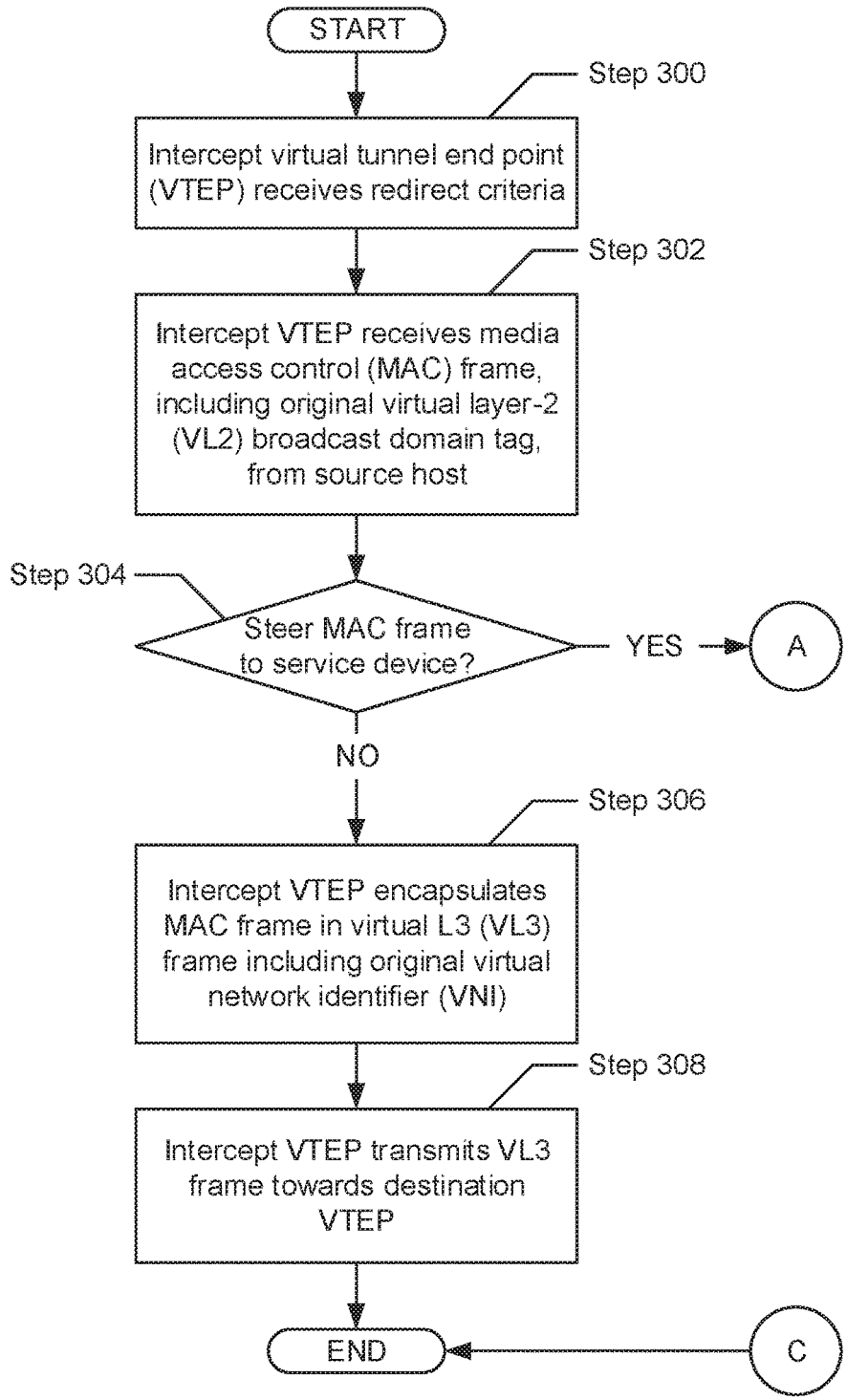
FIGS. 3A-3C show flowcharts describing a method for steering a MAC frame towards a service device in accordance with one or more embodiments of the disclosure.
Figure 3B:
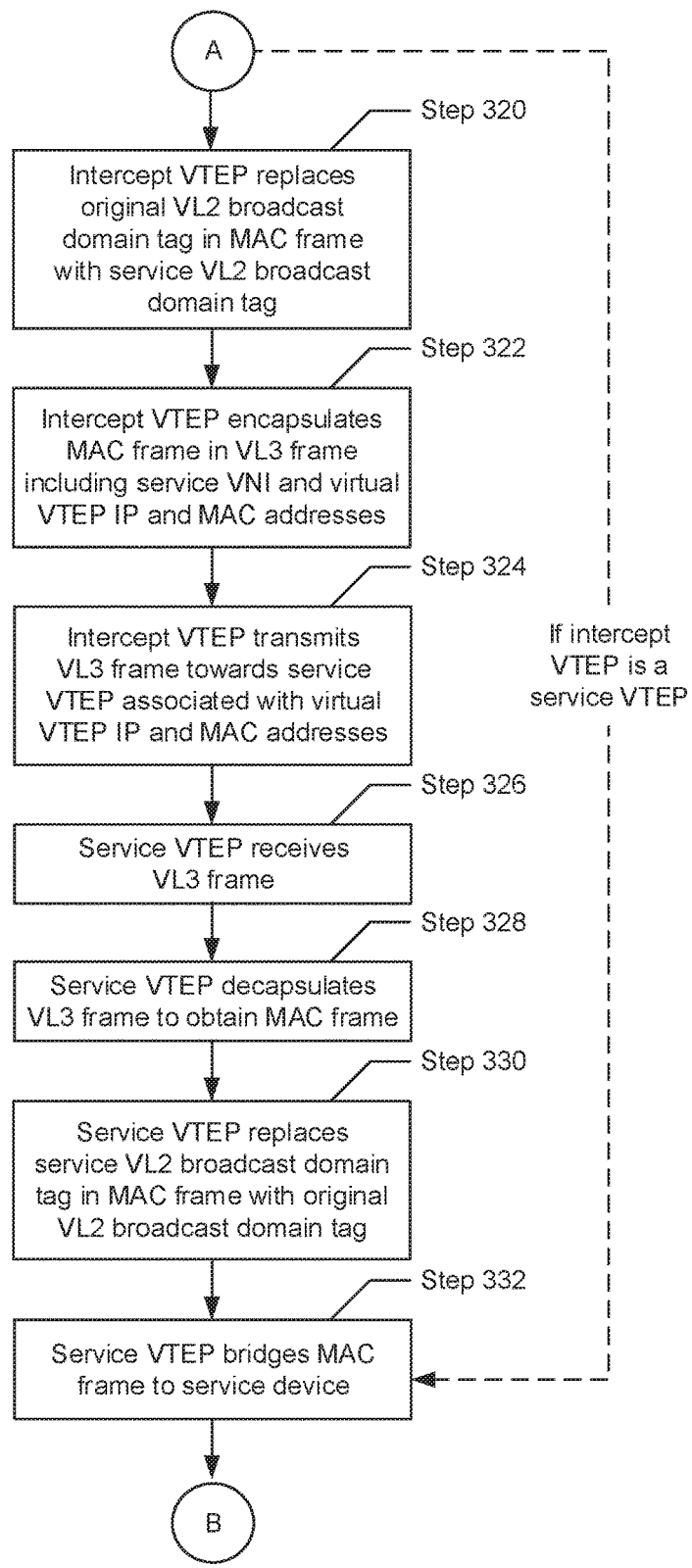
Figure 3C:
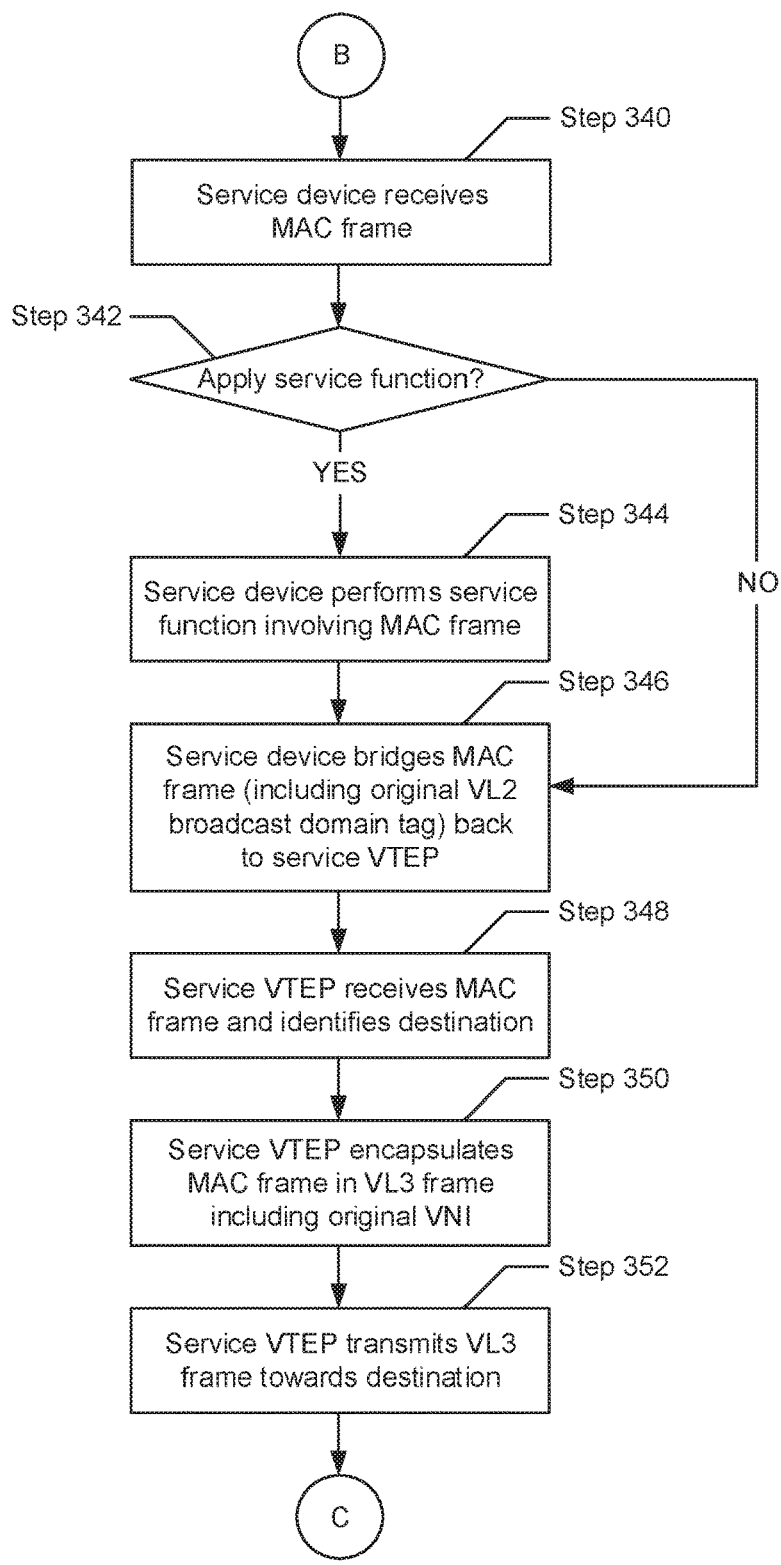

FIGS. 3A-3C show flowcharts describing a method for steering a MAC frame towards a service device in accordance with one or more embodiments of the disclosure. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the disclosure, the steps shown in FIGS. 3A-3C may be performed with any other steps shown in FIGS. 2A-3C without departing from the scope of the disclosure.

Turning to FIG. 3A, in Step 300, redirect criteria (described above) pertaining to one or more service policies is received. In one embodiment of the disclosure, the redirect criteria may be received by an intercept VTEP (i.e., a VTEP executing on a network element in which network traffic is intercepted and redirected to a service device). The redirect criteria substantively specifies requirements, which if matched by information relevant to a MAC frame (i.e., network traffic), instructs the intercept VTEP to redirect the MAC frame towards a service device.

In Step 302, the intercept VTEP receives a MAC frame. In one embodiment of the disclosure, the MAC frame may be generated and transmitted by a source host directly connected to the network element on which the intercept VTEP is executing. Further, in one embodiment of the disclosure, the MAC frame may include an original VL2 broadcast domain tag (e.g., an original VLAN tag) associated with an original VL2 broadcast domain (e.g., an original VLAN). In one embodiment of the disclosure, if an original VL2 broadcast domain tag is a VLAN tag, then the VLAN tag may be an Institute of Electrical and Electronics Engineers (IEEE) 802.1Q tag. Embodiments of the disclosure are not limited to any particular version or implementation of VLAN tagging. Moreover, inclusion of the original VL2 broadcast domain tag associates the MAC frame with the original VL2 broadcast domain, and further, permits the MAC frame to be transmitted/bridged to and from any host and/or any service device belonging to the original VL2 broadcast domain (see e.g., FIG. 1). In another embodiment of the disclosure, the MAC frame may not include an original VL2 broadcast domain tag. In such an embodiment, the untagged MAC frame may be associated with a default VL2 broadcast domain (which may be the original VL2 broadcast domain or any other VL2 broadcast domain). The association may be predetermined based on the current configuration of the network element that which received the MAC frame.

In Step 304, a determination is made as to whether the MAC frame (received in Step 302) is to be redirected (or steered) towards a service device in the network. In one embodiment of the disclosure, the determination may entail comparing one or more data fields (e.g., the source MAC and/or IP address, the destination MAC and/or IP address, the VLAN tag/identifier, etc.) of the MAC frame with the requirements specified in the redirect criteria (received in Step 300). The determination may further entail comparing other attainable information (excluded from the MAC frame), such as, for example, the network interface or port on the network element at which the MAC frame arrived, with the requirements specified in the redirect criteria. If it is determined that any of the MAC frame data fields and/or other attainable information matches the redirect criteria requirements, the process proceeds to Step 320 (see e.g., FIG. 3B). On the other hand, if it is determined that none of the MAC frame data fields and/or other attainable information matches the redirect criteria requirements, the process proceeds to Step 306.

In Step 306, after determining (in Step 304) that none of the MAC frame data fields and/or other attainable information matches the redirect criteria requirements, the intercept VTEP proceeds to encapsulate the MAC frame in a VL3 frame. In one embodiment of the disclosure, the VL3 frame may further include an original VNI. The original VNI may be associated with, for example, the original VL2 broadcast domain, which enables a set of computing devices (e.g., hosts, virtual machines, network elements, etc.) to communicate with another using L2 tunneling across L3 infrastructure. Moreover, the broadcast domain(s) associated with the original VNI may enable communications between the intercept VTEP and any non-service VTEP in the network.

In Step 308, the intercept VTEP transmits the VL3 frame (generated in Step 306) towards a destination VTEP. In one embodiment of the disclosure, the destination VTEP is a non-service VTEP (i.e., a VTEP executing on a network element that is not directly connected to a service device) in the network.

Turning to FIG. 3B, in Step 320, after determining (in Step 304) that any of the MAC frame data fields and/or other attainable information matches the redirect criteria requirements, the intercept VTEP proceeds to replace the original VL2 broadcast domain tag in the MAC frame with a service VL2 broadcast domain tag. In one embodiment of the disclosure, the service VL2 broadcast domain tag may be a distinct VL2 broadcast domain tag associated with network elements that are directly connected to a service device.

In Step 322, after the MAC frame is rewritten to replace the original VL2 broadcast domain tag with the service VL2 broadcast domain tag, the intercept VTEP encapsulates the MAC frame in a VL3 frame. In one embodiment of the disclosure, the VL3 frame may further include a service VNI, a virtual VTEP IP address (as the destination IP address), and a virtual VTEP MAC address (as the destination MAC address). The service VNI may be associated with, for example, a VLAN or VXLAN broadcast domain, which enables communications, using L2 tunneling across L3 infrastructure, between the intercept VTEP and a service VTEP in the network. The virtual VTEP IP and virtual VTEP MAC addresses, as discussed above, may be associated with each of the service devices installed throughout the network (see e.g., FIGS. 2A and 2B).

In another embodiment of the disclosure, after determining (in Step 304) that any of the MAC fame data fields and/or other attainable information matches the redirect criteria requirements, the intercept VTEP may alternatively proceed to bridge the MAC frame to a locally (directly) connected service device. In this embodiment, the intercept VTEP may also be a service VTEP. Subsequently, instead of encapsulating the MAC frame in a VL3 frame to be transmitted to a remote service VTEP (as would be the case in the embodiment described in Step 322), the intercept VTEP would just bridge the MAC frame (received at one network interface from the source host) to the directly connected service device (through another network interface of the network element on which the intercept VTEP is executing) (see e.g., Step 332).

In Step 324, the intercept VTEP transmits the VL3 frame (generated in one embodiment of Step 322) towards a service VTEP associated with the virtual VTEP IP and virtual VTEP MAC addresses. In one embodiment of the disclosure, the VL3 frame may be transmitted towards a service VTEP most proximal (or nearest) to the intercept VTEP. A nearest service VTEP, to which network traffic is redirected, may be identified based on one or more routing metric(s), which are used to determine which route (towards which service VTEP) should be chosen over another. Examples of routing metrics employed in identifying the nearest service VTEP to transmit the VL3 frame include, but are not limited to, next hop count, path reliability, path speed, load, bandwidth, latency, and/or any other routing metric calculated by any existing or future developed routing protocol.

In Step 326, a service VTEP receives the VL3 frame (transmitted by the intercept VTEP in Step 324). In Step 328, the service VTEP subsequently decapsulates (i.e., removes the L3 header information from) the VL3 frame to obtain the MAC frame therein. Thereafter, in Step 330, the service VTEP replaces the service VL2 broadcast domain tag in the MAC frame with an original VL2 broadcast domain tag. In one embodiment of the disclosure, implementation of the service VL2 broadcast domain may be transparent to the various hosts and service devices in the network. Consequently, any MAC frames: (i) that may be communicated to the hosts and/or service devices; and (ii) that include VL2 broadcast domain tags associated with a VL2 broadcast domain other than the original VL2 broadcast domain, need to be rewritten with the original VL2 broadcast domain tag associated with the original VL2 broadcast domain.

In Step 332, the service VTEP bridges the MAC frame (rewritten in Step 330) to a directly attached (or connected) service device. Specifically, in one embodiment of the disclosure, the service VTEP may compare one or more data field(s) of the MAC frame, the VL3 frame, and/or other attainable information with locally stored service policies. The comparison may yield a decision to bridge or forward the MAC frame to the service device directly connected to the network element on which the service VTEP is executing.

Turning to FIG. 3C, in Step 340, the (directly attached or connected) service device receives the MAC frame (bridged over by the service VTEP in Step 332). In Step 342, a determination is made (by the service device) as to whether a service function is to be applied to the MAC frame. In one embodiment of the disclosure, the service device may include instructions, in the form of computer readable program code, which detail the implementation of services provided by the service device. The instructions may further include application criteria that needs to be met for applying those services to redirected network traffic. Similar to redirect criteria described above, the application criteria (locally stored on a service device) may be requirements tied to: (i) a specific network element; (ii) a specific network interface on a network element; (iii) a specific host or virtual machine; (iv) a specific source IP or MAC address and destination IP or MAC address pair; and (v) a specific VLAN and IP or MAC address pair. Embodiments of the disclosure are not limited to the above-mentioned examples. Further, when met, the application criteria associated with a service policy, may enable the service device to perform or apply one or more service function(s) (also associated with that service policy) to the MAC frame. Substantively, if it is determined that a service function is to be applied to the MAC frame, the process proceeds to Step 344. On the other hand, if it is determined that no service function is to be applied to the MAC frame, the process alternatively proceeds to Step 346.

In Step 344, after determining (in Step 340) that a service function is to be applied to the MAC frame, the service device proceeds in performing or applying the service function to (or at least involving) the MAC frame. In Step 346, the service device bridges the MAC frame back to the service VTEP. In one embodiment of the disclosure, the service device may bridge back the MAC frame: (i) after performing (in Step 344) a service function to the MAC frame; or (ii) after determining (in Step 342) that a service function does not need to be applied to the MAC frame, in which case the MAC frame is permitted to pass through towards its designated destination. Further, in one embodiment of the disclosure, the bridged MAC frame may include an original VL2 broadcast domain tag associated with the original VL2 broadcast domain.

In Step 348, the service VTEP receives the MAC frame (bridged back by the service device in Step 346). Subsequently, in one embodiment of the disclosure, the service VTEP processes the MAC frame (i.e., analyzes the L2 header information) to identify a destination for the MAC frame. In Step 350, the service VTEP (after identifying the MAC frame destination in Step 348) encapsulates the MAC frame in a VL3 frame. In one embodiment of the disclosure, the VL3 frame includes the original VNI. In Step 352, the service VTEP transmits the VL3 frame (obtained through encapsulation of the MAC frame in Step 350) towards the destination for the MAC frame. More specifically, in one embodiment of the disclosure, the service VTEP transmits the VL3 frame to another VTEP in the network, which may be executing on a network element directly connected to the destination.

Figure 4:
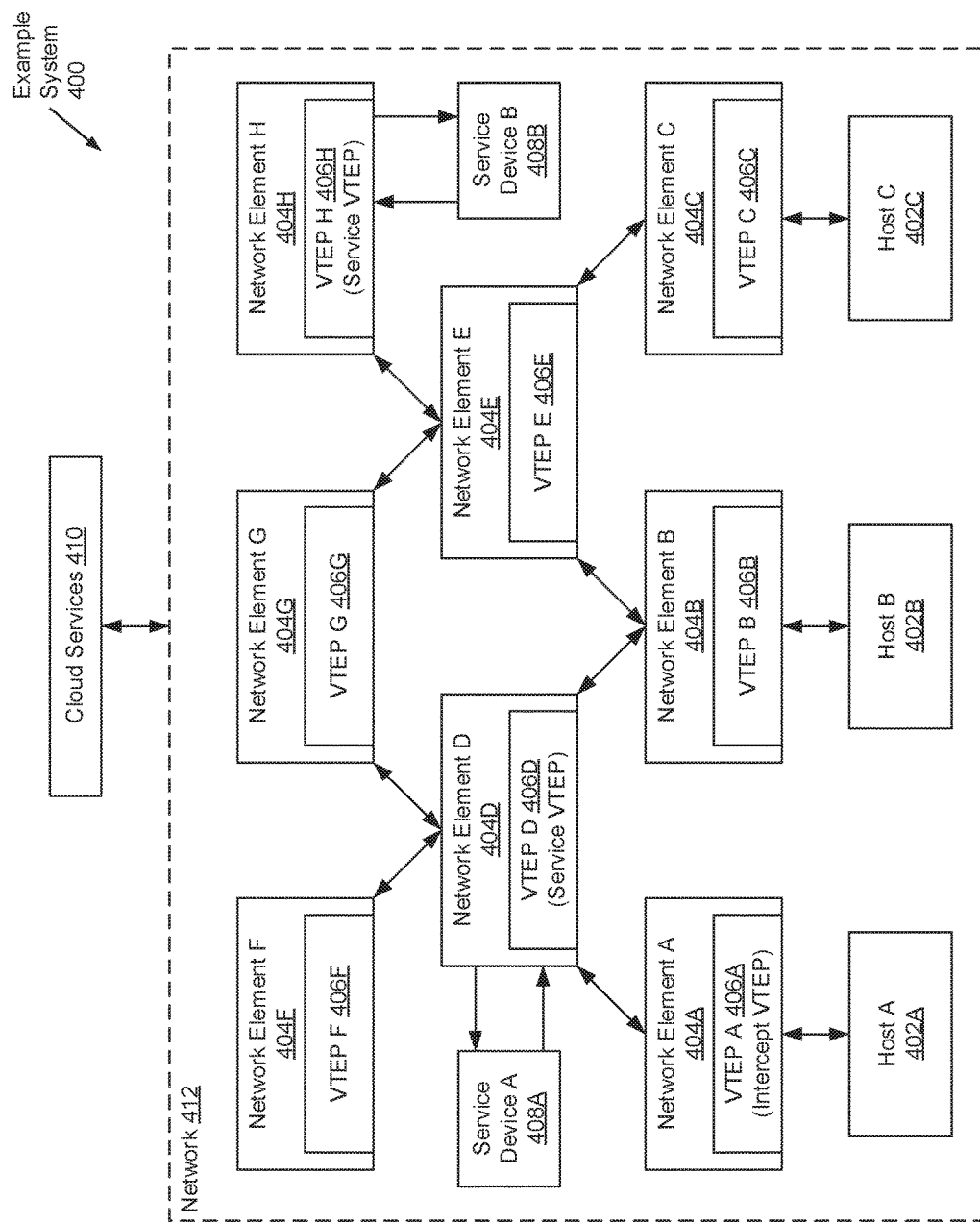
FIG. 4 shows an example system in accordance with one or more embodiments of the disclosure.

FIG. 4 shows an example system in accordance with one or more embodiments of the disclosure. The following example, presented in conjunction with components shown in FIG. 4, is for explanatory purposes only and not intended to limit the scope of the disclosure.

For the example, consider a scenario where two service devices (408A, 408B) (e.g., firewall devices) are installed at strategic locations in a network (412). Specifically, service device A (408A) is attached or connected directly to network element D (404D), while service device B (408B) is attached or connected directly to network element H (404H). Moreover, consider that the hosts (402A-402C) and the service devices (408A, 408B) exchange network traffic via an original VL2 broadcast domain (e.g., an original VLAN).

Further, following embodiments of the disclosure, the same service policies are cloned across both service devices. In addition, the service VTEPs (i.e., VTEP D (406D) and VTEP H (406H)) executing on network elements D (404D) and H (404H), respectively, are assigned a common virtual VTEP IP address and a common virtual VTEP MAC address. At this point, also assume that each service VTEP (406D, 406H) has already learned the MAC address of one or more hosts (402A-402C) and broadcasted their respective host MAC to virtual VTEP IP and MAC mapping to the cloud service (410). Also assume that, after receiving and/or consolidating each mapping, the cloud service (410) has already distributed the mappings, associated with service VTEPs D (406D) and H (406H), to other VTEPs (406A-406H) around the network (412). Subsequently, each of the service VTEPs (406D, 406H) includes one or more associations relating the MAC addresses of hosts (402A-402C) to an interface of their respective network element (404D, 404H) to the directly attached/connected service device (408A, 408H). Meanwhile, each of the non-service VTEPs (406A-406C, 406E-406G) includes associations relating the MAC addresses (associated with a host (402A-402C)) to remote VTEPs identified as the service VTEPs (406D, 406H) and associated with the common virtual VTEP IP address.

Proceeding with the example, now consider that host A (402A) generates a MAC frame designating host C (402C) as the destination. The MAC frame includes an original VLAN tag associated with an original VLAN. After generating the MAC frame, host A (402A) subsequently bridges the MAC frame to (directly connected) network element A (404A). Network element A (404A) processes the MAC frame and determines that the source IP address (associated with host A (402A)) and destination IP address (associated with host C (402C)) included in the MAC frame match requirements specified in redirect criteria for a service policy stored locally. The service policy mandates that the MAC frame be redirected to a service device (408A, 408B) for further processing. Based on meeting the redirect criteria, VTEP A (406A) (i.e., an intercept VTEP), executing on network element A (404A), selects a routing path based on next hop count. Further, selection of the routing path thus identifies (using one of the above-mentioned MAC address to virtual VTEP IP address associations) service VTEP D (406D), rather than service VTEP H (406H), as the recipient of the MAC frame.

Accordingly, VTEP A (406A) replaces the original VLAN tag in the MAC frame with a service VLAN tag associated with a service VLAN. Thereafter, VTEP A (406A) encapsulates the MAC frame in a VL3 frame (e.g., a VXLAN frame), which also includes a service VNI (for communicating with service VTEP D (406D)), as well as the common virtual VTEP IP and common virtual VTEP MAC addresses associated with the service VTEPs (406D, 406H). After instantiating a virtual tunnel originating at intercept VTEP A (406A) and terminating at service VTEP D (406D), VTEP A (406A) subsequently transmits the VXLAN frame towards service VTEP D (406D) executing on network element D (404D).

On arrival at service VTEP D (406D), the VXLAN frame is decapsulated to obtain the MAC frame. Service VTEP D (406D) proceeds in processing the MAC frame and determines that the MAC frame encompasses redirected network traffic, which needs to be bridged over to the directly attached/connected service device A (408A). Based on this determination, service VTEP D (406D) rewrites the MAC frame to replace the service VLAN tag with an original VLAN tag associated with the original VLAN. Thereafter, service VTEP D (406D) bridges the MAC frame to service device A (408A). At service device A (408A), it is determined that the source and destination IP addresses included in the MAC frame match application criteria for applying a service function to the MAC frame. The service function may be, for example, to forward (or permit the continuation of) the MAC frame towards the destination designated by host A (402A), which is host C (402C). After executing the service function, service device A (408A) bridges the MAC frame (which includes the original VLAN tag) back to network element D (404D). Network element D (404D), through service VTEP D (406D), then transmits the MAC towards host C (402C) via a virtual tunnel originating at service VTEP D (406D) and terminating at non-service VTEP C (406C).

Embodiments of the disclosure provide a mechanism for steering network traffic to a most proximal service device for inspection. To that effect, one or more embodiments of the disclosure are advantageous over existing methods and/or systems at least because: (i) embodiments of the disclosure strategically place multiple service devices around a network so as to prevent the traversing of network traffic across multiple hops before arriving at a service device; (ii) embodiments of the disclosure lower the number of hops traversed by network traffic towards reaching a service device, thereby reducing latency; and (iii) embodiments of the disclosure enable the distribution of processing provided by the placement of multiple service devices, thus, allowing the aforementioned mechanism to scale (or network traffic to flow through) without being bottlenecked by the performance of a single service device.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for steering a media access control (MAC) frame, comprising:
  receiving redirect criteria by an intercept virtual tunnel end point (VTEP);
  receiving, from a source host, the MAC frame comprising a set of data fields, wherein the set of data fields comprises an original virtual layer-2 (VL2) broadcast domain tag;
  making a first determination, based on a matching of at least one data field of the set of data fields with the redirect criteria, to steer the MAC frame towards a common virtual VTEP Internet Protocol (IP) address instead of a destination IP address specified in the MAC frame, wherein the destination IP address is associated with a first destination host; and
  transmitting, based on the first determination, the MAC frame towards a service device operatively connected to the common virtual VTEP IP address.

2. The method of claim 1, wherein transmitting the MAC frame towards the service device, comprises:
  identifying, using an association, the intercept VTEP as one of a plurality of service VTEPs associated with the common virtual VTEP IP address, wherein the association relates the destination host to a network element, wherein the intercept VTEP is executing on the network element; and
  bridging, based on the identifying, the MAC frame to the service device, wherein the service device is directly connected to the network element.

3. The method of claim 2, further comprising:
  prior to receiving the redirect criteria:
    learning, by the intercept VTEP, a first MAC address associated with the destination host on a network interface on the network element, wherein the network interface connects to the service device;
    generating and storing the association, wherein the association comprises the first MAC address and the network interface;
    sharing, with a cloud service, the first MAC address and the common virtual VTEP IP address;
    receiving, from the cloud service, a second MAC address associated with a second destination host and a VTEP IP address;
    making a second determination that the VTEP IP address matches the common virtual VTEP IP address; and
    updating, based on the second determination, the association to further comprise the second MAC address.

4. The method of claim 1, wherein transmitting the MAC frame towards the service device, comprises:
  identifying, using an association, a remote VTEP as a service VTEP of a plurality of service VTEPs associated with the common virtual VTEP IP address, wherein the association relates the destination host to the service VTEP;
  rewriting, based on the identifying, the MAC frame to replace the original VL2 broadcast domain tag with a service VL2 broadcast domain tag;

encapsulating the MAC frame in a virtual layer-3 (VL3) frame comprising the common virtual VTEP IP address and a service virtual network identifier (VNI) associated with the service VL2 broadcast domain tag; and transmitting the VL3 frame towards the service device through the remote VTEP, wherein the service device is directly connected to a network element on which the remote VTEP is executing.

5. The method of claim 4, further comprising:
prior to receiving the redirect criteria:
  receiving, from a cloud service, a MAC address associated with the destination host and the common virtual VTEP IP address;
  making a second determination that a VTEP IP address associated with the intercept VTEP does not match the common virtual VTEP IP address; and
  generating and storing an association comprising the MAC address and the common virtual VTEP IP address.

6. The method of claim 1, wherein the redirect criteria specify at least one selected from a group consisting of a first identifier associated with a network element on which the intercept VTEP is executing, a first MAC address associated with the network element, a first IP address associated with the network element, a second identifier associated with a network interface of a plurality of network interfaces on the network element, a third identifier associated with the source host, a second MAC address associated with the source host, a second IP address associated with the source host, a third MAC address associated with the destination host, the destination IP address associated with the destination host, and a virtual local area network (VLAN) tag.

7. A system, comprising:
a service device of a plurality of service devices;
a plurality of network elements operatively connected to the plurality of service devices;
a source host directly connected to a first network element of the plurality of network elements; and
an intercept virtual tunnel end point (VTEP) executing on the first network element, and configured to:
  receive redirect criteria;
  receive, from the source host, a media access control (MAC) frame comprising a set of data fields, wherein the set of data fields comprises an original virtual layer-2 (VL2) broadcast domain tag;
  make a first determination, based on a matching of at least one data field of the set of data fields with the redirect criteria, to steer the MAC frame towards a common virtual VTEP Internet Protocol (IP) address instead of a destination IP address specified in the MAC frame, wherein the destination IP address is associated with a destination host; and
  transmit, based on the first determination, the MAC frame towards the service device, wherein the plurality of service devices is operatively connected to the common virtual VTEP IP address.

8. The system of claim 7, further comprising:
a cloud service operatively connected to the plurality of network elements,
wherein the intercept VTEP receives the redirect criteria from the cloud service.

9. The system of claim 7, further comprising:
a set of service VTEPs executing on a first subset of the plurality of network elements,
wherein each network element of the first subset of the plurality of network elements is directly connected to one service device of the plurality of service devices.

10. The system of claim 9, further comprising:
a set of non-service VTEPs executing on a second subset of the plurality of network elements,
wherein each network element of the second subset of the plurality of network elements is not directly connected to one service device of the plurality of service devices.

11. The system of claim 10, wherein the set of service VTEPs comprises the intercept VTEP.

12. The system of claim 10, wherein the set of non-service VTEPs comprises the intercept VTEP.

13. The system of claim 10, wherein the first subset of the plurality of network elements and the second subset of the plurality of network elements are mutually exclusive.

14. The system of claim 7, wherein the destination host is directly connected to one selected from a group consisting of the first network element and a second network element of the plurality of network elements.

15. A non-transitory computer readable medium (CRM) comprising computer readable program code, which when executed by a computer processor, enables the computer processor to:
receive redirect criteria by an intercept virtual tunnel end point (VTEP);
receive, from a source host, a media access control (MAC) frame comprising a set of data fields, wherein the set of data fields comprises an original virtual layer-2 (VL2) broadcast domain tag;
make a first determination, based on a matching of at least one data field of the set of data fields with the redirect criteria, to steer the MAC frame towards a common virtual VTEP Internet Protocol (IP) address instead of a destination IP address specified in the MAC frame, wherein the destination IP address is associated with a first destination host; and
transmit, based on the first determination, the MAC frame towards a service device operatively connected to the common virtual VTEP IP address.

16. The non-transitory CRM of claim 15, wherein to transmit the MAC frame towards the service device, the computer readable program code, which when executed by the computer processor, enables the computer processor to:
identify, using an association, the intercept VTEP as one of a plurality of service VTEPs associated with the common virtual VTEP IP address, wherein the association relates the destination host to a network element, wherein the intercept VTEP is executing on the network element; and
bridge, based on the identifying, the MAC frame to the service device, wherein the service device is directly connected to the network element.

17. The non-transitory CRM of claim 16, further comprising additional computer readable program code, which when executed by the computer processor, enables the computer processor to:
prior to receiving the redirect criteria:
  learn, at the intercept VTEP, a first MAC address associated with the destination host on a network interface on the network element, wherein the network interface connects to the service device;
  generate and store the association, wherein the association comprises the first MAC address and the network interface;
  share, with a cloud service, the first MAC address and the common virtual VTEP IP address;
  receive, from the cloud service, a second MAC address associated with a second destination host and a VTEP IP address;

make a second determination that the VTEP IP address matches the common virtual VTEP IP address; and update, based on the second determination, the association to further comprise the second MAC address.

18. The non-transitory CRM of claim 15, wherein to transmit the MAC frame towards the service device, the computer readable program code, which when executed by the computer processor, enables the computer processor to:

identify, using an association, a remote VTEP as a service VTEP of a plurality of service VTEPs associated with the common virtual VTEP IP address, wherein the association relates the destination host to the service VTEP;

rewrite, based on the identifying, the MAC frame to replace the original VL2 broadcast domain tag with a service VL2 broadcast domain tag;

encapsulate the MAC frame in a virtual layer-3 (VL3) frame comprising the common virtual VTEP IP address and a service virtual network identifier (VNI) associated with the service VL2 broadcast domain tag; and transmit the VL3 frame towards the service device through the remote VTEP, wherein the service device is directly connected to a network element on which the remote VTEP is executing.

19. The non-transitory CRM of claim 18, further comprising additional computer readable program code, which when executed by the computer processor, enables the computer processor to:

prior to receiving the redirect criteria:

receive, from a cloud service, a MAC address associated with the destination host and the common virtual VTEP IP address;

make a second determination that a VTEP IP address associated with the intercept VTEP does not match the common virtual VTEP IP address; and generate and store an association comprising the MAC address and the common virtual VTEP IP address.

20. The non-transitory CRM of claim 15, wherein the redirect criteria specify at least one selected from a group consisting of a first identifier associated with a network element on which the intercept VTEP is executing, a first MAC address associated with the network element, a first IP address associated with the network element, a second identifier associated with a network interface of a plurality of network interfaces on the network element, a third identifier associated with the source host, a second MAC address associated with the source host, a second IP address associated with the source host, a third MAC address associated with the destination host, the destination IP address associated with the destination host, and a virtual local area network (VLAN) tag.

* * * * *